United States Patent [19]

Blum et al.

[11] Patent Number: 4,482,664

[45] Date of Patent: Nov. 13, 1984

[54] DISPERSIONS OF FINELY DIVIDED SYNTHETIC RESINS IN PLASTICIZERS

[75] Inventors: Rainer Blum, Ludwigshafen-Edigheim; August Lehner, Rödersheim; Bernhard Rubbert, Münster, all of Fed. Rep. of Germany

[73] Assignee: BASF Farben & Fasern AG, Hamburg, Fed. Rep. of Germany

[21] Appl. No.: 422,457

[22] Filed: Sep. 23, 1982

[30] Foreign Application Priority Data

Sep. 29, 1981 [DE] Fed. Rep. of Germany ....... 3138625

[51] Int. Cl.$^3$ .......................... C08K 5/21; C08K 27/06
[52] U.S. Cl. ..................................... 524/212; 524/214; 524/216; 524/507; 524/569
[58] Field of Search ............... 524/210, 212, 214, 216, 524/507

[56] References Cited

U.S. PATENT DOCUMENTS

| | | | |
|---|---|---|---|
| 3,249,584 | 5/1966 | Gasparis | 524/216 |
| 3,547,848 | 12/1970 | Marsh | 106/265 |
| 3,622,534 | 11/1971 | Timmons | 524/216 |
| 3,893,956 | 7/1975 | Brandt | 524/211 |
| 4,252,705 | 2/1981 | Brecker | 524/216 |
| 4,298,511 | 11/1981 | Schimmel | 524/507 |
| 4,383,068 | 5/1983 | Brandt | 524/512 |

FOREIGN PATENT DOCUMENTS

| | | | |
|---|---|---|---|
| 1805693 | 8/1972 | Fed. Rep. of Germany | 524/212 |
| 2928928 | 1/1981 | Fed. Rep. of Germany | . |
| 1461478 | 1/1977 | United Kingdom | 524/216 |

*Primary Examiner*—C. Warren Ivy
*Attorney, Agent, or Firm*—Wells & Wells

[57] ABSTRACT

Dispersions of finely divided synthetic resins in plasticizers, optionally with pigments, fillers and further auxiliaries, contain 0.01 to 30% by weight, relative to the total weight of synthetic resin and plasticizer, of an isocyanate-free reaction product of a monoamine, if appropriate combined with a polyamine compound, with a monoisocyanate and/or polyisocyanate or a polyamine compound with a monoisocyanate, if appropriate combined with a polyisocyanate.

12 Claims, No Drawings

DISPERSIONS OF FINELY DIVIDED SYNTHETIC RESINS IN PLASTICIZERS

BACKGROUND OF THE INVENTION

The present invention relates to dispersions of finely divided synthetic resins in plasticizers, so-called plastisols, which may contain pigments, fillers and further auxiliaries, such as dyestuffs, heat and light stabilizers, and other additives.

Plastisols are free-flowing or pasty compositions which gel on heating to elevated temperatures and form a solid, viscoelastic mass after cooling down.

For coating painted surfaces, for example primed car bodies, with plastisols, special organic bases are proposed as adhesion promoters. Polyamine compounds are proposed, for example in German Auslegeschrift No. 2,232,885, compounds from the class of the Schiff bases are proposed in German Offenlegungsschrift No. 2,512,366, and imidazoles are proposed in German Offenlegungsschrift No. 2,327,958.

To build the organic bases described in these patent applications, the most diverse reactions are described. According to German Offenlegungsschrift No. 2,512,366, suitable Schiff bases containing urea and urethane groups are obtained, for example, by reacting addition products of isophorone diisocyanate and trimethylolpropane with the condensation products of diethylenetriamine with methyl isobutyl ketone.

Plastisols are used in many and varied ways, for example for the manufacture of foils and shaped articles and for coatings as well as for the formation, on metals, of coatings which insulate against sound and protect against corrosion and flying stone chips, for example for air-conditioning ducts and metal doors. A further very important area of application is the use as a metal-bonding agent, for impregnating seams and as an undercoat on motor vehicles.

Most applications have in common that pasty compositions are processed to give relatively thick layers using methods known for the distribution of liquids, for example by means of whirler coating to prepare shaped articles, by means of knife-coating or spreading on fiber webs for the manufacture of synthetic leather, and by means of airless spraying to form undercoat layers on automobiles.

This type of processing presupposes a very pronounced non-Newtonian to thixotropic flow behavior of the plastisols, which effects that the plastisols can readily be spread under the shear stress of application but very rapidly develop a high viscosity in the stationary state after application.

Many methods have been tried to obtain this viscosity behavior, for example choice of fillers and of PVC according to particle size and shape, choice of plasticizers, addition of solvents and of viscosity-regulating additives, for example organically modified montmorillonites, finely divided amorphous silica prepared by flame hydrolysis, soaps of polyvalent metals, such as alumimun oleate or calcium ricinoleate, and the like.

Obtaining the non-Newtonian/thixotropic flow behavior desired is made particularly difficult by the presence of the organic-basic adhesion promoters proposed in the specifications listed above, since these adhesion promoters act as structure or thixotropy breakers.

Attempts have already been made in accordance with German Offenlegungsschrift No. 2,928,928, having a filing date of July 18, 1979, and a publication date of Jan. 29, 1981, to improve the flow behavior of plastisols by adding an isocyanate-free reaction product, of a polyamine compound with a polyisocyanate.

SUMMARY OF THE INVENTION

The object of the present invention is to provide plastisols, i.e. dispersions of finely divided synthetic resins in plasticizers, having improved processing properties, in particular in respect of their flow behavior, and which also have improved bonding on the substrate to be coated.

This object is achieved, surprisingly, by dispersions of finely divided synthetic resins, plasticizers, and, if appropriate, pigments, fillers and further auxiliaries, which contain vinyl chloride homopolymers or copolymers and/or acrylate homopolymers or copolymers as finely divided synthetic resins, mixed with finely divided thermoplastic polyurethane plastics and 0.01 to 30% by weight, relative to the total weight of synthetic resin and plasticizer, of an isocyanate-free reaction product of:

(a) a monoamine and a monoisocyanate or a polyisocyanate or a mixture of a monoisocyanate and a polyisocyanate;

(b) a monoamine in combination with a polyamine compound with a monoisocyanate or a polyisocyanate or a mixture of a monoisocyanate and a polyisocyanate;

(c) a polyamine compound with a monoisocyanate; and (d) a polyamine compound with a mixture of monoisocyanate and polyisocyanate.

The above addition of the reaction products effects in plastisols a remarkably high degree of thickening which, under shear stress, is rapidly decreased and after the end of this shearing also rapidly built up again. Compared to the reaction products in accordance with German Offenlegungsschrift No. 2,928,928 the reaction products used according to the invention have the advantage that their molecular weight can be varied and that not only the monoisocyanates but also the monoamines are used as chain-terminating agents and can control the size of the particular molecule according to the degree of thickening desired.

The reaction products to be used according to the invention also act as excellent adhesion promoters in the dispersions.

The desired type of thixotroping and also the adhesion-promoting action can also be varied by the dispersions according to the invention additionally containing an isocyanate-free reaction product of a polyamine compound with a polyisocyanate.

DESCRIPTION OF THE PREFERRED EMBODIMENTS

As regards the individual components making up the plastisols according to the invention, the following applies.

Possible finely divided synthetic resins are not only vinyl chloride homopolymers but also copolymers of vinyl chloride with vinylidene chloride, vinyl esters of carboxylic acids containing 2 to 10 carbon atoms, such as vinyl acetate, vinyl propionate and Versatic acid vinyl esters, and acrylate homopolymers and copolymers such as polymers and copolymers of acrylic acid esters of alcohols containing 1 to 18 carbon atoms, or polymers and copolymers of methacrylic acid esters of monoalcohols containing 1 to 18 carbon atoms, such as, for example polymers of methyl methacrylate or isobutyl methacrylate or copolymers of methyl methacrylate and butyl acrylate or isobutyl methacrylate, ethyl acrylate and ethylhexyl acrylate.

Preferable finely divided synthetic resins are vinyl chloride homopolymers and vinyl chloride copolymers with vinyl acetate.

Mixtures of the abovementioned synthetic resins and mixtures with finely divided polyurethane plastics, such as mixtures of polyvinyl chloride and polyurethane, examples of which can be taken from German Offenlegungsschrift No. 1,944,310, are also suitable.

The finely divided synthetic resins generally have particle diameters of 1 to 200, preferably 5 to 80, μm.

The liquid phase of the plastisols is in general formed by plasticizers.

Suitable plasticizers are the customary plasticizers, such as tricresyl phosphate, acetyltributyl citrate, diesters of phthalic acid, adipic acid and sebacic acid with saturated and unsaturated alcohols containing 1 to 18 carbon atoms, for example dioctyl phthalate, dinonyl phthalate, diallyl phthalate and didecyl phthalate, as well as plasticizers belonging to the groups of the saturated and unsaturated liquid polyesters and of the liquid epoxide compounds, such as, for example, epoxidized castor oil or polyesters of adipic acid and butanediol. The content of plasticizers in the plastisols is so chosen that it is sufficient to form a plastisol of liquid to pasty consistency.

The liquid phase of the plastisols can also contain binders dissolved therein and which can be physically drying and/or chemically crosslinking. Polymerizable monomers of a very wide variety of substance classes can also be used in the plasticizers, if necessary together with suitable activators.

Finely divided synthetic resin and plasticizer are contained in the dispersions according to the invention in general in a weight ratio of synthetic resin to plasticizer of 10 to 70% to 30 to 90%, preferably 40 to 60% to 60 to 40%.

The isocyanate-free reaction product to be used according to the invention is either
 a. the reaction product of a monoamine, if appropriate combined with a polyamino compound, and a monoisocyanate and/or polyisocyanate, or
 b. a reaction product of a polyamine compound and a monoisocyanate, if appropriate combined with a polyisocyanate.

In an advantageous embodiment, a monoamine is reacted with a polyisocyanate or a monoisocyanate.

In another embodiment, the monoamine can also be reacted with a mixture of a monoisocyanate and a polyisocyanate.

A further embodiment proposes reacting a monoamine with a polyisocyanate together with a polyamino compound.

However, it can also be advantageous to react a mixture of a monoamine and a polyamine compound with a monoisocyanate or a polyisocyanate or a mixture of a monoisocyanate and a polyisocyanate.

In a further advantageous embodiment, a polyamine compound is reacted with a monoisocyanate. However, it can also be advantageous to react the polyamine compound with a mixture of a monoisocyanate and a polyisocyanate.

In many cases it is advantageous to add to the dispersions containing the reaction products according to the invention also an isocyanate-free reaction product of a polyamine compound with a polyisocyanate.

As regards the individual reaction components the following applies:

Suitable monoamines are in particular branch-chained or straight-chained aliphatic monoamines having saturated or unsaturated groups, for example N-n-alkenylamines, N-n-alkylamines or N-sec.-alkylamines. Further suitable monoamines are cycloaliphatic amines and hydroxymonoamines. Examples which may be mentioned of suitable monoamines are benzylamines, cyclohexylamine, ethylamine, n-propylamine, sec.-propylamine, n-butylamine, sec.-butylamine, tert.-butylamine, n-pentylamine, —methylbutylamine, ethylpropylamine, β-ethylbutylamine and methylbutylamine. Those monoamines are preferably used which have 1-4 aliphatic carbon atoms, such as benzylamine, propylamine and tert.-butylamine. Suitable hydroxymonoamines are monohydroxyamines, such as 2-aminoethanol, 1-aminoethanol, 2-aminopropanol, 3-aminopropanol, 1-amino-2-propanol, 2-amino-2-methyl propanol, 2-aminobutanol, 2-aminobutanol, 2-aminopentanol and polyhydroxymonoamines, such as 2-amino-2-methyl-1,3-propanediol and 2-amino-2-ethyl-1,3-propanediol. Alteratively, mixtures of one or more monoamines and one or more monohydroxyamines and/or polyhydroxyamines can be used.

Those organic compounds are suitable for use as polyamine compound which contain more than one amino group capable of reaction with isocyanate groups. Examples of such polyamine compounds are those having primary or secondary amino groups, such as polyethyleneimine, hexamethylenediamine, 1,2-propylenediamine, tetrapropylenepentamine, preferably high molecular weight polyamide amines, as obtained, for example, by reacting dicarboxylic acids, such as dimerized fatty acids, with an excess of polyvalent amines and having amine numbers of 80 to 500, preferably 200 to 420, and viscosities of 1 to 80 mPa.s.

A typical compound of this type has, for example, an amine number of 360 with a viscosity of about 32 Pa.s.

Possible polyisocyanates suitable for the reaction with the monoamines and polyamine compounds are diisocyanates and polyisocyanates, such as aliphatic, cycloaliphatic, araliphatic, aromatic and heterocyclic polyisocyanates, for example, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate, and optional mixtures of these isomers, 1-isocyanato-3,3,5-trimethyl-5-isocyanatomethyl-cyclohexane (German Auslegeschrift No. 1,202,785), 2,4- and 2,6-hexahydrotoluylene diisocyanate and optional mixtures of these isomers, hexahydro-1,3- and/or -1,4-phenylene diisocyanate, perhydro-2,4'- and/or -4,4'-diisocyanate, 1,3- and 1,3- and 1,4-phenylene diisocyanate, 2,4- and 2,6-toluylene diisocyanate and optional mixtures of these isomers, diphenylmethane-2,4'- and/or -4,4'-diisocyanate, naphthylene-1,5-diisocyanate, triphenylmethane-4,4', 4''-triisocyanate, polyphenyl polymethylene polyisocyanate (obtained by aniline/formaldehyde condensation and subsequent phosgenation according to British Pat. Nos. 874,430 and 848,671), perchlorinated arylpolyisocyanates (cf. German Auslegeschrift No. 1,157,601), polyisocyanates having carbodiimide groups (cf. German Pat. No. 1,092,007), diisocyanates in accordance with U.S. Pat. No. 3,492,330, polyisocyanates having allophanate groups (cf. British Pat. No. 994,890, Belgian Pat. No. 761,626, and Dutch Patent Application No. 7,102,524), polyisocyanates having isocyanurate groups (cf. German Patents Nos. 1,022,789, 1,222,067 and 1,027,394; and German Offenlegungsschrift No. 1,929,034 and 2,004,048), polyisocyanates having urea groups (cf. Belgian Pat. No. 752,261 and U.S. Pat. No. 3,394,164), polyisocyanates having acrylated urethane groups (cf. German Pat. No. 1,230,778), polyisocyanates having biuret groups (cf. German Pat. No. 1,101,394, British Pat. No. 889,050, and French Pat. No. 7,017,514), polyisocyanates prepared by telomerisation reactions (cf. Belgian Pat. No. 723,640), polyisocyanates having ester groups (cf. British Pat. Nos. 956,474 and 1,072,956, U.S. Pat. No. 3,567,763, and German Pat. No. 1,231,688), or reaction products of the abovementioned isocyanates with acetals (cf. German Pat. No. 1,072,385).

Monoisocyanate compounds in the sense of the invention are aliphatic, aromatic and/or cycloaliphatic monoisocyanates. The aliphatic monoisocyanates can have, for example, up to 25 C atoms. Not only in this case but also in the case of aromatic and cycloaliphatic monoisocyanates those compounds are particularly preferable which are technically readily accessible and inexpensive. Examples are alkyl isocyanate, ethyl isocyanate, propyl isocyanate, butyl isocyanate, stearyl isocyanate, secondary alkyl isocyanates, such as tert.-butyl isocyanate and/or aromatic isocyanates, such as phenyl isocyanate, 1-naphthyl isocyanate, tolyl isocyanate, toluenesulfonyl isocyanate or cycloaliphatic isocyanates such as cyclohexyl isocyanate.

The monoamines or polyamine compounds are reacted with the monoisocyanates and/or polyisocyanates in ratios which are such that each isocyanate group is matched by at least one amino group which can react with it. In preferable reaction products 5 to 40 equivalent % of the amino groups of the monoamines or of the polyamine compound are reacted with the isocyanate groups of the monoisocyanate or polyisocyanate.

The amines are reacted with the isocyanate in general at temperatures of 15° to 50° C., if appropriate in the presence of suitable solvents or of plasticizers suitable for plastisol preparation.

Plastisols according to the invention contain 0.01 to 30, preferably 0.1 to 1.5, % by weight of the isocyanate-free reaction product.

To establish a given yield point an amount of the isocyanate-free reaction products to be used according to the invention is necessary which is no more than 10% of the amount otherwise used to establish an identical yield point by the addition of finely divided silica or organically modified montmorillonite. However, despite the same high yield point the viscosity under shear stress is considerably lower than when using customary thickeners, whereby the processibility is very much improved.

It is also advantageous that the properties of the plastisols are less impaired by foreign materials.

The plastisols can also contain a number of auxiliaries and additives, for example for controlling the viscosity, the gelling rate, the improvement of the light and heat stability and the shelf life, as well as pigments, dyestuffs and fillers. To improve still further the bonding to the articles to be coated, the plastisols can also contain known adhesion-improving additives, such as phenol-aldehyde resins or epoxide resins with the corresponding hardener components of dicyandiamide, amines or polyamino-amides.

The plastisols according to the invention can be prepared in customary mixing units by adding the reaction products of amine and isocyanate during the mixing of the plastisol constituents or subsequently to the prepared plastisol.

The preferable procedure is to stir the reactants separately into the reaction vessel in the plastisol preparation and forming the structure-forming reaction products by spontaneous chemical reaction.

SPECIFIC EXAMPLES

The examples are intended to illustrate the invention without, however, restricting it to these examples. The parts and percentages given in the comparative examples and the examples are unless otherwise indicated parts by weight and percentages by weight.

COMPARATIVE EXAMPLE 1

23 parts of emulsion polyvinyl chloride (paste-PVC), K value 78
12 parts of dioctyl phthalate
8 parts of diisodecyl phthalate
3 parts of epoxidized soya oil
8 parts of butyl benzyl phthalate
0.5 parts of barium stearate
38 parts of chalk (calcite)
1 parts of black iron oxide are kneaded for 20 minutes in a planetary mixer to give a homogenous paste, which is degassed by briefly applying a vacuum. The plastisol obtained has a grey color.

COMPARATIVE EXAMPLE 2

23 parts of emulsion PVC (as in comparative example 1)
14 parts of dioctyl phthalate
8 parts of diisodecyl phthalate
3 parts of epoxidized soya oil
8 parts of butyl benzyl phthalate
1.5 parts of polyamide-amine (based on a reaction product of dimerised linoleic fatty acid with an ·excess of diethylene triamine) (amine No. 290)
0.5 parts of barium stearate
38 parts of chalk (calcite)
1 parts of black iron oxide are kneaded for 20 minutes in a planetary mixer to give a homogenous paste, which is degassed by briefly applying a vacuum.

COMPARATIVE EXAMPLE 3

23 parts of emulsion PVC (as in comparative example 1)
14 parts of dioctyl phthalate
8 parts of diisodecyl phthalate
3 parts of epoxidized soya oil
8 parts of butyl benzyl phthalate
1.5 parts of polyamide amine (as in comparative example 2) (amine No. 290)
0.5 parts of barium stearate
3 parts of finely divided, amorphous $SiO_2$, about 200 $m^2/g$
38 parts of chalk (calcite)
1 parts of black iron oxide the $SiO_2$ is first made into a gel in the dioctyl phthalate by means of a dissolver, and then all constituents are kneaded for 20 minutes in a planetary mixer to give a homogenous paste, which is degassed by briefly applying a vacuum.

COMPARATIVE EXAMPLE 4

23 parts of emulsion PVC (as in comparative example 1)
14 parts of dioctyl phthalate
8 parts of diisodecyl phthalate
3 parts of epoxidized soya oil
8 parts of butyl benzyl phthalate
1.5 parts of polyamide amine (as in comparative example 2) (amine No. 290)
0.5 parts of barium stearate
5 parts of organically modified montmorillonite
38 parts of chalk (calcite)
1 parts of black iron oxide the organically modified montmorillonite is first pasted to give a gel in the dioctyl phthalate and diisodecyl phthalate by means of a dissolver, and then the remaining recipe constituents are kneaded together with this gel for 20 minutes in a planetary mixer to give a homogenous paste, which is degassed by briefly applying a vacuum.

COMPARATIVE EXAMPLE 5

23 parts of emulsion PVC (as in comparative example 1)
14 parts of dioctyl phthalate
8 parts of diisodecyl phthalate
3 parts of epoxidized soya oil
8 parts of butyl benzyl phthalate
1.5 parts of Schiff base (= adhesion promoter B of German Offenlegungsschrift 2,512,366, page 6)
0.5 parts of barium stearate
38 parts of chalk (calcite)
1 parts of black iron oxide are kneaded for 20 minutes in a planetary mixer to give a homogenous paste, which is degassed by briefly applying a vacuum.

COMPARATIVE EXAMPLE 6

23 parts of emulsion PVC (as in comparative example 1)
14 parts of dioctyl phthalate
8 parts of diisodecyl phthalate
3 parts of epoxidized soya oil
8 parts of butyl benzyl phthalate
1.5 parts of Schiff base (= adhesion promoter B of German Offenlegungsschrift 2,512,366, page 6)
0.5 parts of barium stearate
3 parts of finely divided, amorphous $SiO_2$, about 200 $m^2/g$
38 parts of chalk (calcite)
1 parts of black iron oxide are kneaded for 20 minutes in a planetary mixer to give a homogenous paste, which is degassed by briefly applying a vacuum.

COMPARATIVE EXAMPLE 7

23 parts of emulsion PVC (as in the comparative examples)
14 parts of dioctyl phthalate
8 parts of diisodecyl phthalate
3 parts of epoxidized soya oil
8 parts of butyl benzyl phthalate
1.5 parts of polyamide-amine (as in comparative example 2) (amine No. 290)
0.5 parts of barium stearate
0.4 parts of unpurified methanediphenyl diisocyanate (so-called crude MDI)
38 parts of chalk (calcite)
1 parts of black iron oxide are kneaded for 20 minutes in a planetary mixer to give a homogenous paste, which is degassed by briefly applying a vacuum.

EXAMPLE 8

(in accordance with the invention)

14 parts of dioctyl phthalate
4 parts of C 12-C 14 n-paraffin mixture
8 parts of diisodecyl phthalate
3 parts of epoxidized soya oil
8 parts of butyl benzyl phthalate
1.5 parts of polyamide-amine (as in comparative example 2)
1.0 parts of isopropylamine
   mix and add dropwise with vigorous stirring
2.68 parts of unpurified methanediphenyl diisocyanate (so-called crude MDI)
   a strongly thixotropic gel is obtained, to which are added
23 parts of E-PVC (as in comparative examples)
0.5 parts of barium stearate
38 parts of chalk (calcite)
1 parts of black iron oxide and kneaded for 20 minutes in a planetary kneader to give a homogenous paste which is degassed by applying a vacuum.

EXAMPLE 9

(in accordance with the invention)

14 parts of dioctyl phthalate
4 parts of C 12-C 14 n-paraffin mixture
8 parts of diisodecyl phthalate
3 parts of epoxidized soya oil
8 parts of butyl benzyl phthalate
2.14 parts of benzylamine, mix with vigorous stirring and add
2.7 parts of crude MDI, a thixotropic gel results, and add
1.5 parts of polyamide amine (as comparative example 2) and with vigorous stirring
0.4 parts of crude MDI, the thixotropic gel is further thickened and added are
23 parts of E-PVC (as comparative examples)
0.5 parts of barium stearate
38 parts of chalk (calcite)
1 parts of black iron oxide kneaded for 20 minutes in a planetary kneader to give a homogenous paste, which is degassed by applying a vacuum.

EXAMPLE 10

(in accordance with the invention)

14 parts of dioctyl phthalate
4 parts of C 12-C 14 n-paraffin mixture
8 parts of diisodecyl phthalate
3 parts of epoxidized soya oil
8 parts of butyl benzyl phthalate
2.14 parts of benzylamine, mix with vigorous stirring and add
2.7 parts of crude MDI, a thixotropic gel results, and add
1.5 parts of polyamide amide (as in comparative example 2)
23 parts of E-PVC (as comparative examples)
0.5 parts of barium stearate
38 parts of chalk (calcite)
1 parts of black iron oxide knead for 20 minutes in a planetary kneader to give a homogenous paste and degass in a vacuum.

EXAMPLE 11

(in accordance with the invention)

| | |
|---|---|
| 14 parts of | dioctyl phthalate |
| 4 parts of | C 12-C 14 n-paraffin mixture |
| 8 parts of | diisodecyl phthalate |
| 3 parts of | epoxidized soya oil |
| 8 parts of | butyl benzyl phthalate |
| 2.95 parts of | stearyl isocyanate |
| 0.5 parts of | crude MDI mix with vigorous stirring and add |
| 3.05 parts of | polyamide amine (as comparative example 2) a thixotropic gel results, to which are added |
| 23 parts of | E-PVC as in the comparative examples |
| 0.5 parts of | barium stearate |
| 38 parts of | chalk (calcite) |
| 1 parts of | black iron oxide | knead for 20 minutes in a planetary kneader to give a homogenous paste and degass in a vacuum.

To test the adhesive strength, metal strips primed by electrocoating are bonded with the pastes in an overlapping manner and the force necessary to separate the bond is measured in a tensile-strength tester.

To test for mechanical stability, these pastes are knife-coated in a series of films with increasing thickness onto metal panels, which are baked for 20 minutes at 170° C. while hanging in a vertical position. The test involves finding out to which film thickness the pastes are mechanically stable, i.e. no longer run off. This film thickness should be as high as possible; the structural viscosity built up in the pastes without shear stress must thus be fairly stable to hold the intrinsic weight of thick layers. The viscosity is measured in a rotary viscometer under a shear of $D=356\ s^{-1}$; this viscosity should be as small as possible to ensure good processability in an airless spray unit. To assess the processability the pastes are also sprayed in an airless spray unit.

Comparison table

| Examples and comparative examples | Mechanical Stability (up to mm thickness) | Viscosity (mPa·s) at $D = 356s^{-1}$ | Sprayability | Flow | Adhesion (N/cm²) |
|---|---|---|---|---|---|
| 1 | runs off | 2,150 | good | very good | <10 |
| 2 | runs off | 1,780 | good | very good | 182 |
| 3 | 3 | 4,750 | poor | poor | 151 |
| 4 | 4 | 8,350 | very poor | very poor | 124 |
| 5 | runs off | 2,028 | good | good | 82 |
| 6 | 3 | 5,236 | poor | poor | 51 |
| 7 | 7 | 2,580 | good | good | 246 |
| 8 | 7 | 1,904 | very good | very good | 258 |
| 9 | 9 | 1,804 | very good | very good | 250 |
| 10 | 7 | 1,697 | very good | very good | 268 |
| 11 | 7 | 1,840 | very good | very good | 217 |

The table shows that the dispersions containing the reaction products according to the invention can be adjusted to a low viscosity and nevertheless have excellent mechanical stability. This combination of properties results in very good sprayability and very good flow without drip tendency even in thick layers. As the column for adhesion shows, the reaction products according to the invention also act as excellent adhesion promoters.

We claim:

1. A dispersion of finely divided synthetic resins and plasticizers, comprising: finely divided synthetic resins selected from the group consisting of vinyl chloride polymers, acrylate polymers and mixtures of vinyl chloride polymers and acrylate polymers and 0.01 to 30% by weight, relative to the total weight of synthetic resin and plasticizers, of an isocyanate-free reaction product selected from the group consisting of
   (a) a monoamine reacted with a monoisocyanate, a polyisocyanate or a mixture of a monoisocyanate and a polyisocyanate;
   (b) a monoamine in combination with a polyamine compound reacted with a monoisocyanate, a polyisocyanate or a mixture of a monoisocyanate and a polyisocyanate;
   (c) a polyamine compound reacted with a monoisocyanate;
   and
   (d) a polyamine compound reacted with a mixture of monoisocyanate and polyisocyanate wherein said reaction product is produced by reaction in the presence of said plasticizers.

2. The dispersion of claim 1, further comprising said finely divided synthetic resins including finely divided thermoplastic polyurethane plastics.

3. The dispersion of claim 2, further comprising pigments, fillers and further auxiliaries.

4. The dispersion of claim 1, wherein said polyisocyanates have a given number of isocyanate groups and said polyamine compounds have amino groups with 5 to 40 equivalent percent of said amine groups reacted with said isocyanate groups.

5. The dispersion of claim 1, wherein said polyamine compound is the reaction product of dimerized linoleic fatty acid with an excess of diethylene triamine, said monoamine is isopropylamine and said polyisocyanate is methanediphenyl diisocyanate.

6. The dispersion of claim 1, wherein said monoamine is benzylamine, said polyisocyanate is methanediphenyl diisocyanate, and said polyamine compound is the reaction product of dimerized linoleic fatty acid with an excess of diethylene triamine.

7. The dispersion of claim 1, wherein said polyamine compound is the reaction product of dimerized linoleic fatty acid with an excess of diethylene triamine and said mixture of monoisocyanate and polyisocyanate is a mixture of stearyl isocyanate and methane-diphenyl diisocyanate.

8. A metal article coated with a dispersion of finely divided synthetic resins and plasticizers, comprising: finely divided synthetic resins selected from the group consisting of vinyl chloride polymers, acrylate polymers and mixtures of vinyl chloride polymers and acrylate polymers and 0.01 to 30% by weight, relative to the total weight of synthetic resin and plasticizer, of an isocyanate-free reaction product selected from the group consisting of
   (a) a monoamine reacted with a monoisocyanate, a polyisocyanate or a mixture of a monoisocyanate and a polyisocyanate;
   (b) a monoamine in combination with a polyamine compound reacted with a monoisocyanate, a polyisocyanate or a mixture of a monoisocyanate and a polyisocyanate;
   (c) a polyamine compound reacted with a monoisocyanate;
   and (d) a polyamine compound reacted with a mixture of monoisocyanate and polyisocyanate wherein said reaction product is produced by reaction in the presence of said plasticizers.

9. A metal article having an adhesive material applied thereto comprising a dispersion of finely divided synthetic resins and plasticizers, comprising: finely divided synthetic resins selected from the group consisting of vinyl chloride polymers, acrylate polymers and mixtures of vinyl chloride polymers and acrylate polymers and 0.01 to 30% by weight, relative to the total weight of synthetic resin and plasticizer, of an isocyanate-free reaction product selected from the group consisting of:
 (a) a monoamine reacted with a monoisocyanate, a polyisocyanate or a mixture of a monoisocyanate and a polyisocyanate;
 (b) a monoamine in combination with a polyamine compound reacted with a monoisocyanate, a polyisocyanate or a mixture of a monoisocyanate and a polyisocyanate;
 (c) a polyamine compound reacted with a monoisocyanate;
 and
 (d) a polyamine compound reacted with a mixture of monoisocyanate and polyisocyanate wherein said reaction product is produced by reaction in the presence of said plasticizers.

10. The underside of a motor vehicle undercoated with a dispersion of finely divided synthetic resins and plasticizers, comprising: finely divided synthetic resins selected from the group consisting of vinyl chloride polymers, acrylate polymers and mixtures of vinyl chloride polymers and acrylate polymers and 0.01 to 30% by weight, relative to the total weight of synthetic resin and plasticizer, of an isocyanate-free reaction product selected from the group consisting of:
 (a) a monoamine reacted with a monoisocyanate, a polyisocyanate or a mixture of a monoisocyanate and a polyisocyanate;
 (b) a monoamine in combination with a polyamine compound reacted with a monoisocyanate, a polyisocyanate or a mixture of a monoisocyanate and a polyisocyanate;
 (c) a polyamine compound reacted with a monoisocyanate;
 and
 (d) a polyamine compound reacted with a mixture of monoisocyanate and polyisocyanate wherein said reaction product is produced by reaction in the presence of said plasticizers.

11. A film prepared from a dispersion of finely divided synthetic resins and plasticizers, comprising: finely divided synthetic resins selected from the group consisting of vinyl chloride polymers, acrylate polymers and mixtures of vinyl chloride polymers and acrylate polymers and 0.01 to 30% by weight, relative to the total weight of synthetic resin and plasticizer, of an isocyanate-free reaction product selected from the group consisting of
 (a) a monoamine reacted with a monoisocyanate, a polyisocyanate or a mixture of a monoisocyanate and a polyisocyanate;
 (b) a monoamine in combination with a polyamine compound reacted with a monoisocyanate, a polyisocyanate or a mixture of a monoisocyanate and a polyisocyanate;
 (c) a polyamine compound reacted with a monoisocyanate;
 and
 (d) a polyamine compound reacted with a mixture of monoisocyanate and polyisocyanate wherein said reaction product is produced by reaction in the presence of said plasticizers.

12. A shaped article prepared from a dispersion of finely divided synthetic resins and plasticizers, comprising: finely divided synthetic resins selected from the group consisting of vinyl chloride polymers, acrylate polymers and mixtures of vinyl chloride polymers and acrylate polymers and 0.01 to 30% by weight, relative to the total weight of synthetic resin and plasticizer, of an isocyanate-free reaction product selected from the group consisting of
 (a) a monoamine reacted with a monoisocyanate, a polyisocyanate or a mixture of a monoisocyanate and a polyisocyanate;
 (b) a monoamine in combination with a polyamine compound reacted with a monoisocyanate, a polyisocyanate or a mixture of a monoisocyanate and a polyisocyanate;
 (c) a polyamine compound reacted with a monoisocyanate;
 and
 (d) a polyamine compound reacted with a mixture of monoisocyanate and polyisocyanate wherein said reaction product is produced by reaction in the presence of said plasticizers.

* * * * *